United States Patent [19]
Holdredge, Jr.

[11] 3,731,901
[45] May 8, 1973

[54] EXPANDABLE CORE ASSEMBLY

[76] Inventor: Ernest C. Holdredge, Jr., c/o Allastics, Inc., 1275 Enterprise Drive, Norcross-Tucker Industrial Park, Norcross, Ga. 30071

[22] Filed: Mar. 29, 1971

[21] Appl. No.: 128,955

Related U.S. Application Data

[63] Continuation-in-part of Ser. No. 12,812, Feb. 19, 1970, Pat. No. 3,613,605.

[52] U.S. Cl. ................. 249/180, 425/417, 425/817
[51] Int. Cl. ........................................... B28b 7/30
[58] Field of Search .................. 425/190, 192, 414, 425/417, DIG. 10; 249/180

[56] References Cited

UNITED STATES PATENTS

| 2,501,877 | 3/1950 | Rumble | 249/180 |
| 668,474 | 2/1901 | Adam | 249/180 |
| 2,676,372 | 4/1954 | Venner et al. | 249/180 |

Primary Examiner—H. A. Kilby, Jr.
Attorney—Jones & Thomas

[57] ABSTRACT

An expandable core assembly for use in an injection molding operation designed to produce hollow plastic articles of manufacture. The core assembly is positioned between injection mold halves and expanded to define a cavity within an article which is molded between the injection mold halves. After molding, the core assembly is collapsed for convenient removal from within the mold halves and molded article.

12 Claims, 12 Drawing Figures

INVENTOR
ERNEST C. HOLDREDGE, JR.

BY Jones & Thomas
ATTORNEYS

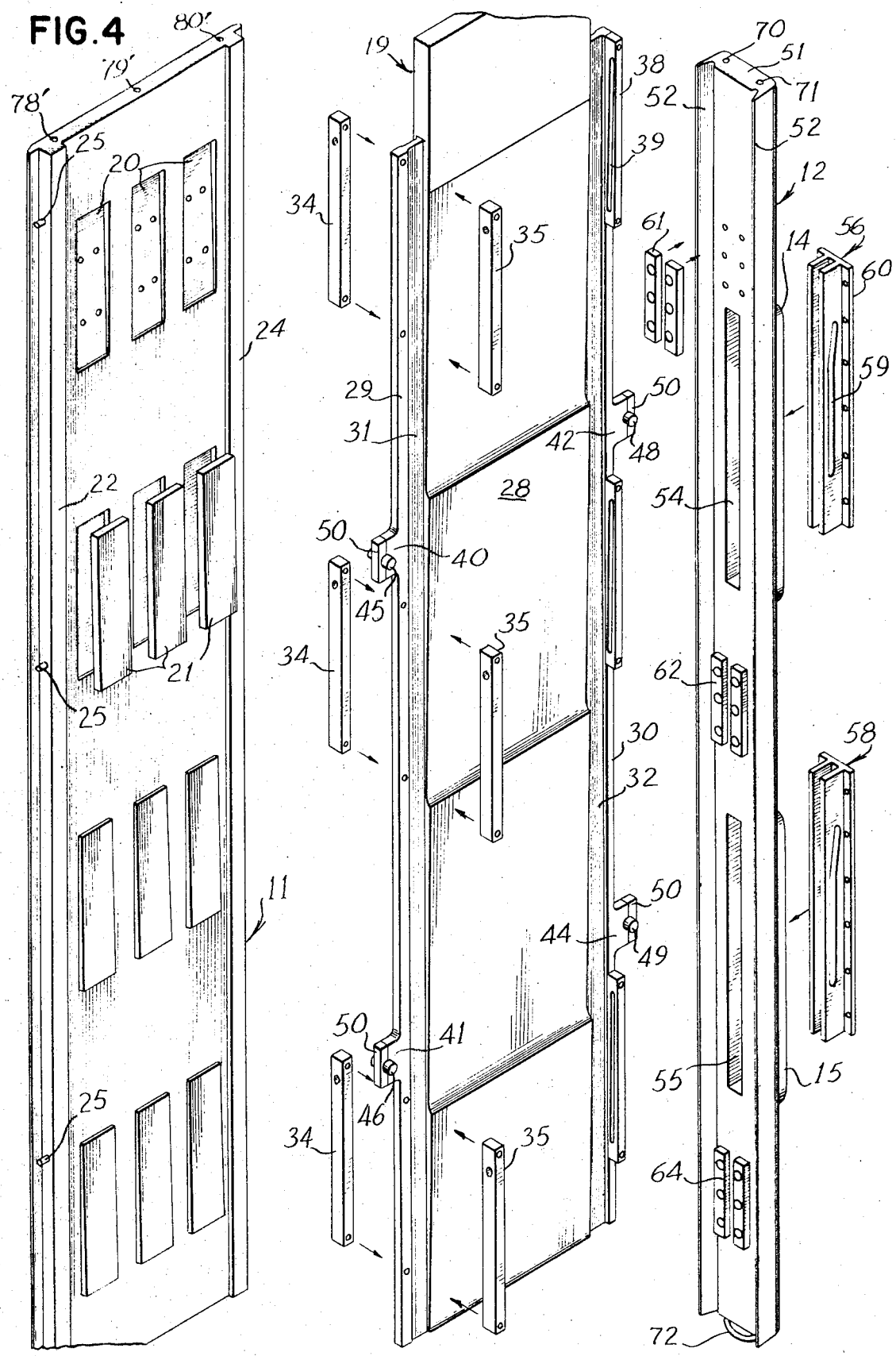

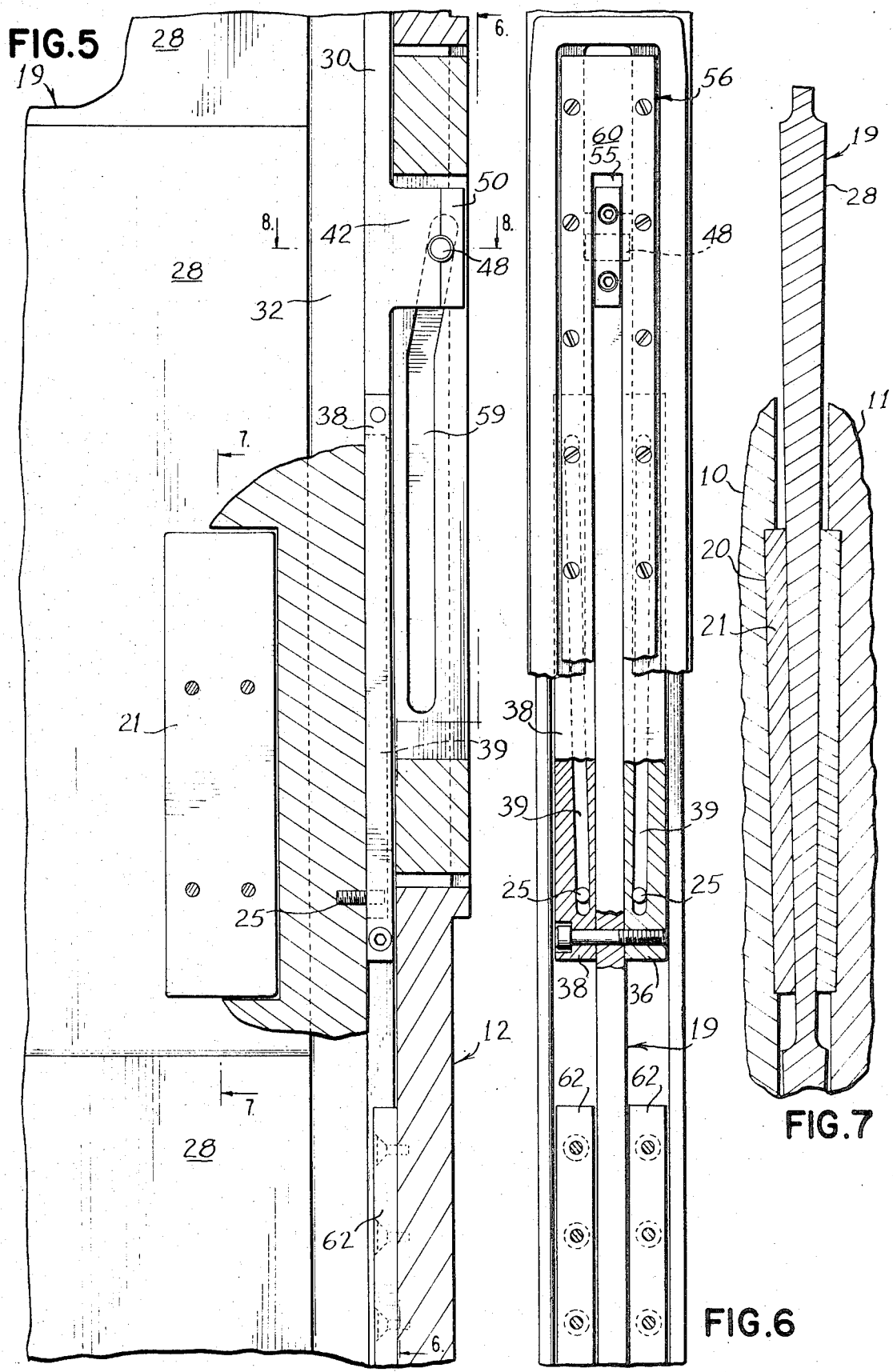

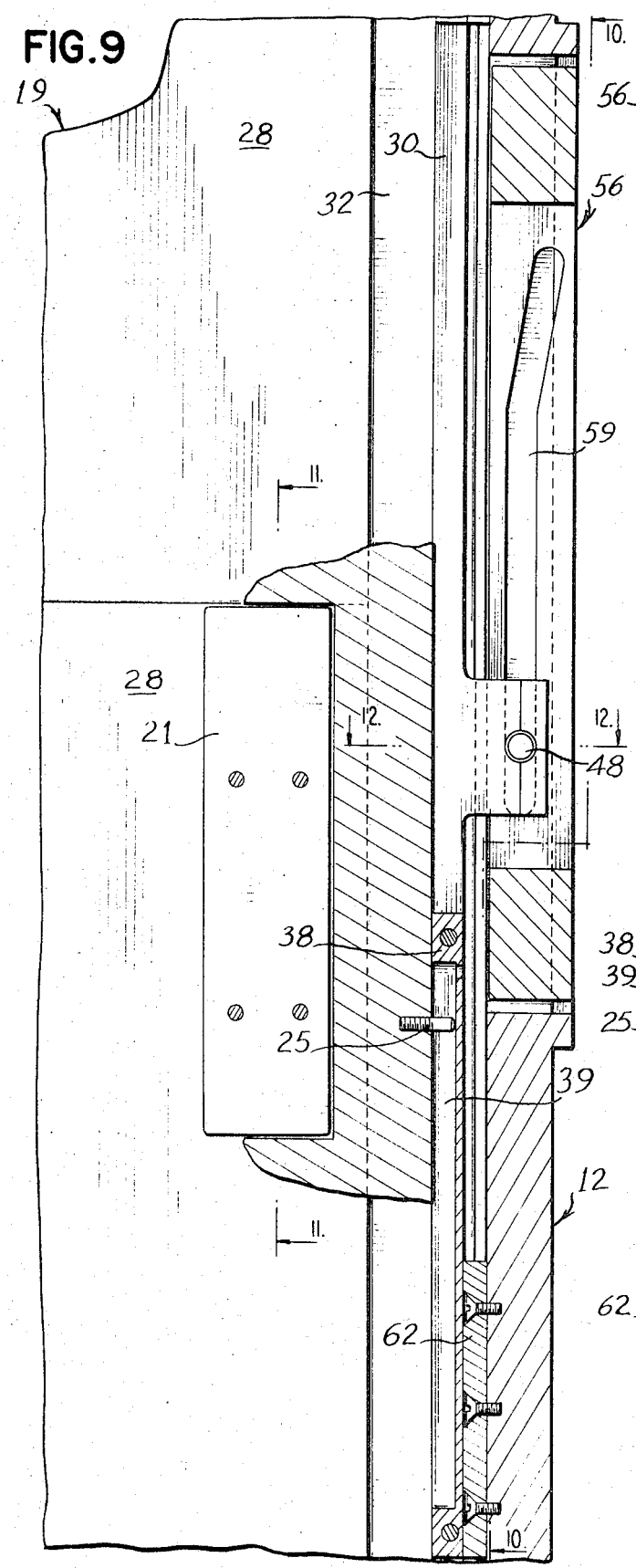
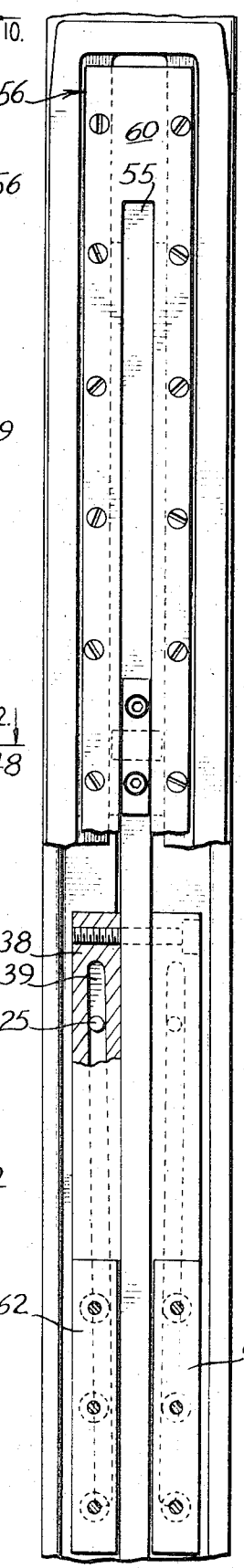
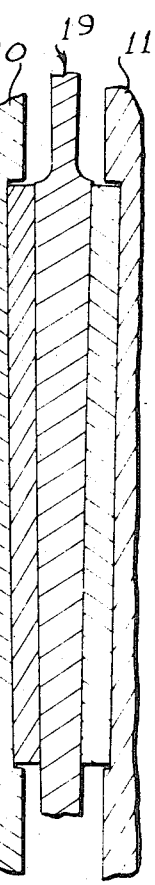

1

EXPANDABLE CORE ASSEMBLY

CROSS-REFERENCE TO RELATED APPLICATIONS

This application is a continuation-in-part of my copending application Ser. No. 12,812, filed Feb. 19, 1970 and issued as U.S. Pat. No. 3,613,605.

This invention relates to an expandable core assembly and method for use thereof. More particularly, the present invention concerns a core assembly which may be positioned between two injection mold halves to define a cavity within an article to be molded within the mold defined by the mold halves.

When molding plastic articles in an injection process, hollow articles having internal cavities have been prepared in essentially two processes. The first and least desirable process involves manufacture of article halves which are joined together in an operation external of the injection molding machine. A second and more desirable process involves the use of multiple insertable cores which are basically immobile after insertion and serve to define a cavity equal to their stationary shape. The multiple cores are individually inserted into slots in the mold halves prior to plastic injection and are individually removed after plastic injection and cooling of the molded article. As should be apparent, the second process involves expensive and complicated equipment and is a time consuming process involving relatively long periods of down time for the injection molding machine.

It is an object of the present invention, therefore, to provide a method and apparatus for injection molding of hollow plastic articles which involves the use of an expandable and contractable core assembly to define multiple cavities or cavities having an area larger than the area of the collapsed core assembly.

This and other objects, features and advantages of the present invention will become apparent from consideration of the following specification when taken in conjunction with the accompanying drawings in which:

FIG. 4 is an exploded perspective view of a core assembly as shown in FIG. 3;

FIG. 5 is a partial cross-sectional view of a core assembly as shown in FIG. 3;

FIG. 6 is a cross-sectional view taken along the line 6—6 in FIG. 5;

FIG. 7 is a cross-sectional view taken along the line 7—7 in FIG. 5;

FIG. 9 is a view similar to FIG. 5 but showing the core assembly in a partially expanded condition;

FIG. 10 is a cross-sectional view taken along the line 10—10 in FIG. 9;

FIG. 11 is a cross-sectional view taken along the line 11—11 in FIG. 9; and

Figure 3:
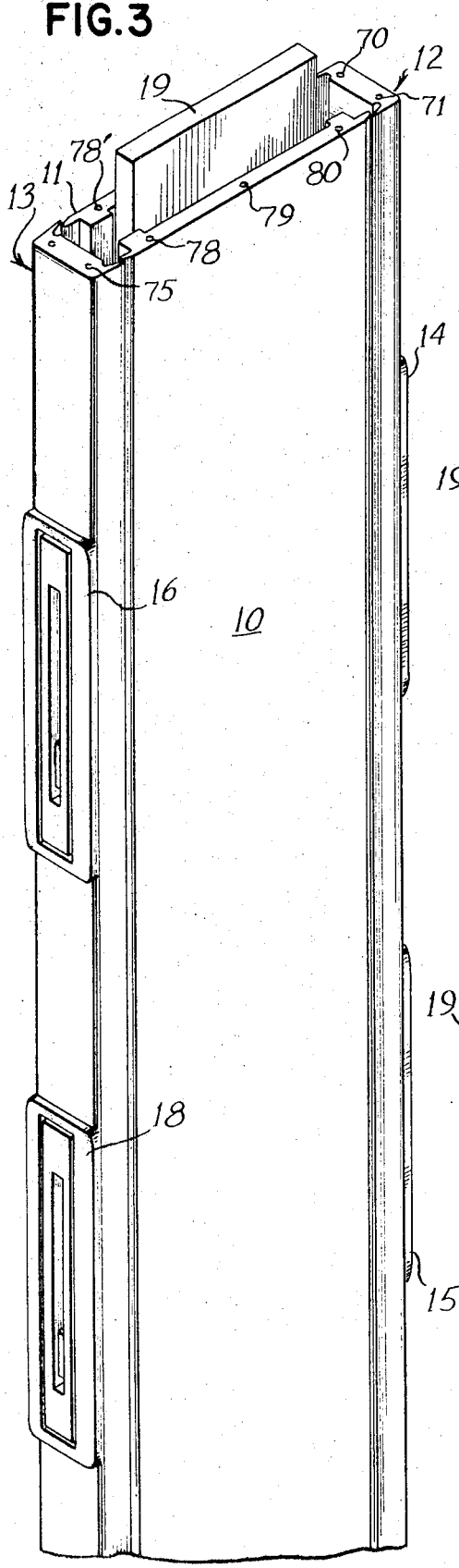
FIG. 3 is a partial perspective view of a core assembly in accordance with the present invention, the core assembly being in an expanded condition.

Referring now more particularly to the drawings, and to that embodiment of the invention shown by way of illustration, it will be seen in FIG. 3 that the core assembly includes a front plate 10 and a rear plate 11 disposed parallel to the front plate. A right-hand end cap 12 and a left-hand end cap 13 are disposed parallel to each other along the right-hand and left-hand edges respectively of front and rear plates 10 and 11. Spaced along end caps 12 and 13 are projecting bosses, 14 and 15 on end cap 12 and 16 and 18 on end cap 13. Extending from the center of the core assembly is an actuating power wedge plate 19.

Referring now to FIG. 4 of the drawing for a better understanding of the construction of the core assembly, it will be understood that the front plate 10 is substantially identical to the rear plate 11, and the left-hand end cap 13 is substantially identical to the right-hand end cap 12. In FIG. 4, the left-hand end cap 13 and the front plate 10 are omitted for purposes of clarity.

The rear plate 11 has a plurality of recesses 20 along its inside surface, each of the recesses 20 being adapted to receive a wedge insert 21. As here shown, there are four rows of wedge inserts. Along the full length of the rear plate 11 are rails 22 and 24, each rail having three rear plate cam pins 25 projecting perpendicularly therefrom. It should be understood that when assembled the front plate 10 is disposed parallel to the rear plate 11 with its wedge inserts 21 facing the wedge inserts 21 of the rear plate 11, and having similar pins 25.

Positioned between the front plate 10 and the rear plate 11 is actuating plate 19 which includes a plurality of wedge surfaces 28. As here shown, there are four wedge surfaces 28 to correspond to the four rows of wedge inserts 21. This arrangement will be discussed more fully hereinafter.

Along the right-hand and left-hand edges of actuating power wedge plate 19 are cam support shoulders 29 and 30 which are joined to the main body of actuating plate 19 by connecting webs 31 and 32 respectively. The cam support shoulders carry cam blocks 34 and 35 on their rear and front surfaces respectively, the cam blocks 34 and 35 being aligned with each other and secured by means of bolts or the like to the cam support shoulder 31. The left cam support shoulder 31 has three sets of cam blocks 34 and 35 spaced along its length; and, the right cam support shoulder 30 has complementary blocks 36 and 38 spaced along its length arranged similarly to the cam blocks 34 and 35.

Each of the cam blocks 34, 35, 36 and 38 has a cam slot 39 along its length with the slots 39 facing towards the center of actuating plate 19. As will be more fully understood later, the pins 25 on the front and rear plates 11 are received within the slots 39 to cause contraction of the front and rear plates 10 and 11 when appropriate.

Projecting outwardly from cam support shoulders 31 and 30 are spaced-apart cam pin necks 40, 41, 42 and 44 respectively. Each of these cam pin necks 40, 41, 42 and 44 has a semicircular recess in its distal end to receive cam pins 45, 46, 48 and 49. The cam pins 45, 46, 48 and 49 are held in place by appropriate cam pin caps indicated at 50.

Figure 8:
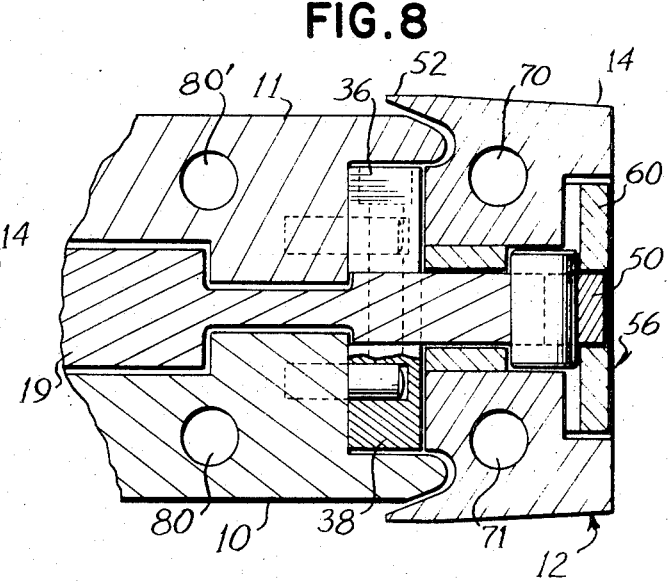
FIG. 8 is a cross-sectional view taken along the line 8—8 in FIG. 5.
Figure 12:
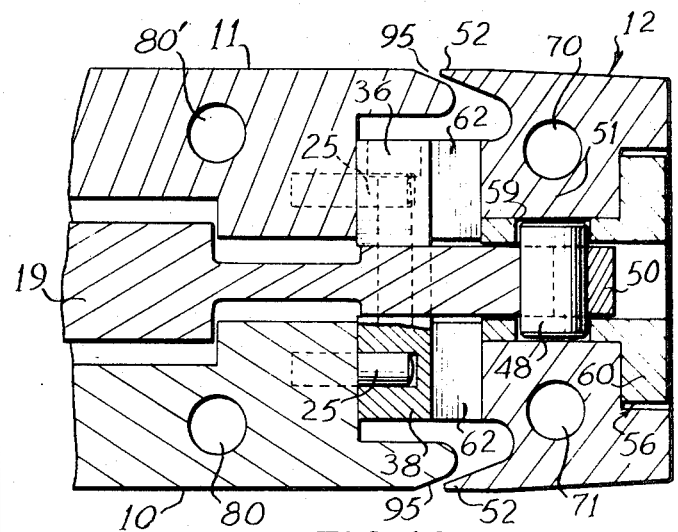
FIG. 12 is a cross-sectional view taken along the line 12—12 in FIG. 9.

Referring now to the end cap 12 in FIG. 4 of the drawings, it will be seen that the cap is basically a channel-shaped member having a central web 51 with front and rear flanges 52 projecting inwardly therefrom. Slots 54 and 55 extend through the central web 51 and through the bosses 14 and 15 respectively. Slots 54 and 55 are adapted to receive identical end cap cam members 56 and 58 respectively. The cam member 56 has the shape of the Greek letter Pi when viewed in cross-section and has opposed cam passages 59 defined in each of its legs. Referring to FIG. 8 of the drawings, it will be seen that the boss 14 is spot-faced to receive the mounting plates 60 of the cap cam member 56 so that the member 56 can be inserted into the boss with the legs of the cam member 56 extending into the slot 54. The cam pin 48 rides within the opposed cam passages 59. It should again be mentioned that the member 56 is typical of the construction at all four of the bosses 14, 15, 16, and 18, each having similar cam passages with the cam pins 45, 46, 48 and 49 riding along the cam surfaces of the passages.

Referring now to FIG. 4, it may be seen that end cap 12 includes three pairs of spacer blocks 61, 62 and 64 attached thereto. There is a complementary set of spacer blocks attached to the end cap 13 for each of the pairs of spacer blocks 61, 62 and 64.

At this point, it should be understood that when the core assembly is properly assembled the actuating power wedge plate 19 is sandwiched between the front and rear plates 10 and 11 with the end caps 12 and 13 substantially adjoining the right-hand and left-hand edges of the front and rear plates. The pins 25 are received within the slots 39 of the cam blocks 34, 35, 36 and 38 so that, if we assume that the front and rear plates 11 are vertically fixed, as the actuating plate 19 is moved inwardly and outwardly the slots 39 in the cam blocks traverse the pins 25 and cause a motion of the pins 25 and their side-plates in accordance with the slope of the cam slots 39 in the cam blocks 34-38. Simultaneously, it should be understood that as the actuating plate is moved inwardly the wedge surfaces 28 engage the wedge inserts 21 to urge the wedge inserts 21 and their side-plates away from the actuating plate. The combination of the motion caused by the wedge surfaces action against the wedge inserts 21 and the motion caused by the pins traversing the cam slots 39 causes the front and rear plates 10 and 11 to move outwardly and inwardly in response to the movement of the actuating plate 19. It should be understood that the motion caused by each of these actions is complementary.

In addition, as the actuating plate 19 moves inwardly and outwardly, the cam pins 45, 46, 48 and 49 ride along the surfaces of cam passages 59 and, since these cam surfaces are in effect fixed to end caps 12 and 13, the end caps are moved laterally as the cam pins move along the surfaces.

An interesting aspect of the present invention concerns the construction materials selected for the present embodiment of this invention. A lightweight aluminum alloy is chosen for the core-assembly front and rear plates and the core-assembly end caps. The alloy is selected primarily because of its high thermal conductivity and free machineability. In addition, the alloy is sufficiently flexible so that application of plastic material under pressure to the core assembly and particularly the core-assembly end caps causes fins 52 on the end caps to deflect inwardly and seal against surfaces 95 of the front and rear plates. Such a seal prevents the undesirable entry of plastic material into the internal mechanism of the core assembly. Ferrous alloys could be used for these parts and it would not be necessary to provide internal supports for applied stresses.

Hardened steel of two primary hardness levels is used for the heavily worked parts such as the power-wedge plate, the core side-plate cams, the end-cap cams, the end-cap cam pins, the front and rear plate cam pins and the wedge inserts. Hardnesses have been chosen for these parts to allow adjustment and/or replacement of the more easily manufactured item.

OPERATION

The operation of the present core assembly is preferably performed in conjunction with an appropriately designed injection molding apparatus. Such an apparatus conventionally includes a stationary mold half, a moveable mold half and a plastic material supply apparatus such as an extruder. In the present operation embodiment, a foamed plastic material and its associated preparation equipment is employed. Such a construction material has been found to be most desirable for use with the present core assembly in the construction of foamed thermoplastic pallets having a hollow interior cavity.

A discussion of the internal movements and operations of the core assembly is presented initially to facilitate an understanding of the overall operation of the assembly and associated injection molding equipment. For convenience of discussion, motions of end caps 12 and 13 and motions of front and rear plates 10 and 11 will be taken one at a time. It should be understood, however, that the motions occur simultaneously during the operation of the assembly. With reference to FIG. 5 of the drawings, it will be seen that the end cap 12 is in a partially retracted position. If it is considered that the apparatus as shown in FIG. 5 is moving in the direction of retracting end cap 12, the actuating plate 19 will be moving upwardly in the drawing. The end cap will be stationary in the vertical direction and the actuating plate 19 together with shoulder 30 and its attached cam pin neck 42 and cam pin 48 will be moving upwardly. The cam pin 48 will ride along the surface of cam passage 59 and the end cap 12 will be drawn inwardly towards the actuating plate 19, or to the left as viewed in FIG. 5.

Assuming now that the end cap 12 is to be extended to place the core assembly in its expanded position, the actuating plate 19 will be moved downwardly as viewed in FIG. 5 to cause cam pin 48 to move down, riding along the surface of cam passage 59. As the cam pin 48 moves down along the cam surface, the end cap 12 will be moved outwardly; further, it will be seen that the entire outward movement will take place with only a short movement of the cam pin 48. After the end cap 12 has moved out to its full extent, the cam pin 48 will ride along the straight portion of the cam surface 59 which will cause no further outward movement of end cap 12, but the additional motion is necessary to arrange the interior supports properly and provide continuous support and outward motion of the side plates 10 and 11 through wedge inserts 21 which also ride on actuating plate 19.

Since, as described so far, the only retaining support for end caps 12 and 13 is the connection by means of the cam pin 48, the end caps 12 and 13 might not withstand full molding pressure without substantial deflection or failure as encountered in a large injection molding apparatus such as shown in the drawing, as the cam pin 48 moves along the straight portion of the cam surface 59, the cam blocks 36 and 38 will move into an abutting relationship with the spacer blocks 61. Since spacer blocks 61 are rigidly attached to end cap 12, and cam blocks 36 and 38 are rigidly attached to actuating plate 19, forces exerted against the outside of end cap 12 will be transmitted to the solid material of the actuating plate and supported thereby.

In this connection, it will be noted that the spacer blocks 61, 62, and 64 are located on each side of the bosses 14 and 15. As will be seen later, the areas of the bosses 14 and 15 do not receive the molding pressure, so no additional support in these areas is necessary.

Motion of the front and rear plates 10 and 11 will now be considered and attention is directed primarily to FIGS. 6 and 10 of the drawings.

It will be seen that the cooperation of the pins 25 with the cam blocks 34, 35, 36, and 38 serves a multiple function. Since the front and rear plates 10 and 11 must move outwardly with respect to the actuating plate 19, some means must be provided to hold the assembly together, yet to allow for the necessary motion. Since each of the plates 10 and 11 has the extending pins 25 and there is a cam block such as the cam blocks 36 and 38 on each side of the wedge plate 19, one must simply hold the two wedge blocks 36 and 38 together, and the pins 25 will hold the plates 10 and 11 to the cam blocks 36 and 38. To allow for the necessary motion, the cam blocks 36 and 38 have slots 39 which are slanted to act as a cam track. As the actuating plate 19 is moved upwardly, the cam blocks 36 and 38 move upwardly and the slant of cam tracks 39 causes the pins 25 to move towards each other and cause retraction of the front and rear plates 10 and 11. As the actuating plate 19 is moved downwardly, the front and rear plates 10 and 11 are driven apart by plate 19 and the pins 25 idle along cam tracks 39 in blocks 36 and 38. The retracted position is shown in FIG. 6 of the drawings and the expanded position is shown in FIG. 10 of the drawings.

Again, considering the extreme pressures involved in an injection molding process, the arrangement described above with the pins 25 riding in the cam slots 39 would be insufficient to withstand the forces. Also, the core assembly of the present invention is contemplated for use in relatively large moldings so that the core assembly itself would be quite heavy. To provide the motivating force for expanding the front and rear plates 10 and 11, the wedge surfaces 28 on the actuating member 19 are used in conjunction with the wedge inserts 21. Referring to FIG. 7 of the drawings it will be seen that the front and rear walls 10 and 11 are in their retracted positions and the narrower portion of the actuating member 19 is abutting the wedge inserts 21. As the actuating member 19 is moved downwardly, the wedge inserts 21 on each side of the actuating member 19 are forced apart to expand the front and rear walls 10 and 11, moving the two plates away from each other. FIG. 11, then, shows the front and rear plates 10 and 11 in their expanded position with the thickest portion of the actuating member 19 between the wedge inserts 21. In this position, forces exerted on the front and rear plates 10 and 11 are opposed through solid metal rather than depending upon such relationship as pins 25 riding in slots 39.

A further consideration for a core assembly for molding, and especially the molding of plastics, concerns cooling of the molded article to a solid condition. Cooling of the core assembly of the present invention is provided by coolant passageways 70 and 71 extending longitudinally throughout the end cap 12, two two passageways 70 and 71 being connected at the bottom of the core assembly by a U-tube 72. Similar passageways 74 and 75 are defined in end cap 13 and connected by a U-tube 76 at the bottom of the core assembly. The front and rear plates 10 and 11 have coolant passages extending longitudinally throughout their length, these passageways being designated 78, 78', 79, 79', 80 and 80'. At the bottom of the core assembly are U-tubes 78'' connecting coolant passageways 78 and 78', U-tube 79'' connecting passageway 79 and 79'', and U-tube 80'' connecting passageways 80 and 80'. It will thus be seen that coolant may be directed through the core assembly to cool a molded article.

Figure 1:
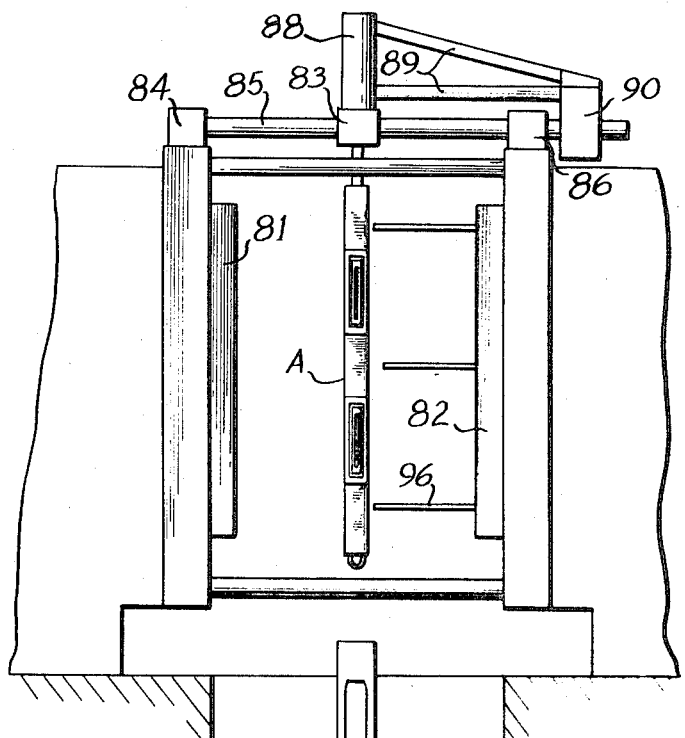
FIG. 1 is a somewhat schematic side-elevational view of an open injection molding apparatus showing two mold halves with a core assembly positioned therebetween.

Attention is now directed to FIG. 1 of the drawings showing the core assembly in position in an injection molding machine. The core assembly is held in place with respect to the molding machine by the use of pipe nipples threadedly received into the top openings of the coolant passageways such as passageways 70, 71, et seq. These pipe nipples are then held by appropriate means to bearing blocks such as the bearing block 83 shown in FIG. 1, and appropriate tubing is connected to the pipe nipples to carry the coolant to and from the core assembly.

The injection molding machine shown in FIG. 1 is a conventional machine having a stationary mold half 81 and a moveable mold half 82 opposed to each other and aligned for proper mating. The core assembly A is suspended between the two halves 81 and 82 so that when the two mold halves are brought together to form a closed mold, the core assembly A is within that closed mold.

Though numerous physical arrangements may be employed themselves to suspend the core assembly A for proper operation, one suitable form of apparatus is here illustrated. A block 84 is mounted on the stationary mold half, and rods such as rod 85 are fixed to block 84. Bearing blocks, such as block 86, are then fixed to the moveable mold half with rods 85 slideable within bearing blocks 86. Block 83 is also a bearing block that is slideable along rods 85, and it is from block 83 that the core assembly A is suspended. Also carried by bearing block 83 is a fluid actuated cylinder 88 having its actuating rod (not shown) attached to the actuating plate 19 for operation thereof. The fluid actuated cylinder 88 is braced through braces 89 to a further bearing block 90 which is also slideable on rods 85.

Figure 2:
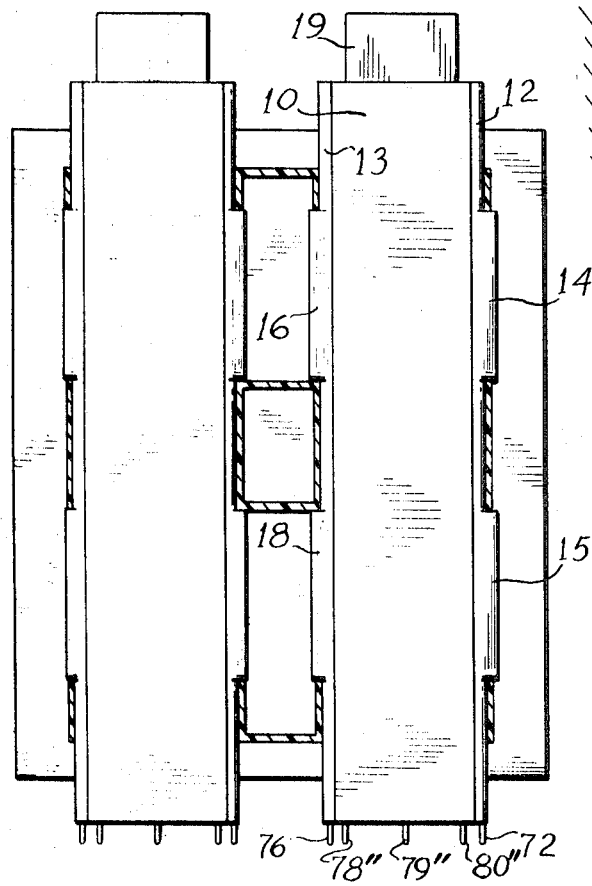
FIG. 2 is a front-elevational view of one core half with two core assemblies in position, and showing a molded pallet in cross-section.

An operation cycle will now be disclosed. Since the item to be molded in this illustration is a pallet in which fork holes are provided on all four sides, two of the core assemblies A are required. The relationship of these core assemblies to the mold halves 81 and 82 is shown in FIG. 2 of the drawings. From this figure it will be seen that the bosses 14, 15, 16 and 18 on each of the core assemblies extend beyond the actual molding cavity and into recesses in the mold to define the side fork holes in the pallet structure. For ease of explanation, only one core assembly will be mentioned and discussed in the operating cycle. It should be apparent that the additional assembly will operate in like fashion.

At the initiation of the cycle, the press mold is at its maximum open position and a collapsed core assembly is suspended between the two mold halves. The operation of the core assembly is automatically controlled from an auxiliary panel which is interconnected with the press and extruder controls. Switches are activated on the control panels (not shown) and the moveable mold half initiates closing movement. The moveable half 82 engages the core assemblies A which seat therein, thus causing the bearing blocks 83 and 90 to slide along rods 85 so that the entire apparatus is moved towards the stationary half 81. Though the core assembly A is very long, providing a long lever arm, the inertia of initial movement is somewhat overcome by the presence of the fluid actuated cylinder 88 mounted in alignment over the assembly. Since the fluid actuated cylinder 88 is rigidly tied to the bearing block 90, a substantial resistance is provided to prevent swinging of the core assembly A.

When the core assembly seats in the moving mold half, a limit switch is actuated which energized a cylinder 88 to drive the actuating wedge plate into the core assembly and cause the front and rear plates to spread due to the taper of the wedge plate work surfaces 28 riding on the wedge inserts 21. At the beginning of the actuating wedge plate stroke, and through the first 25 percent of its motion, the cam pins 45, 46, 48 and 49, riding in the end-cap cams 56 and 58, begin their motion along the cam surfaces 59 causing the end-caps 12 and 13 to move outward. The cam pins then idle along in the end-cap cam surfaces 59 through the remaining 75 percent of the stroke. Through correct choices of cam surfaces, the actuating wedge plate, at the end of its stroke, seals the front and rear plates to the end-caps. At this point, the core assembly is both indexed in the moving mold half and fully expanded with the moving half continuing toward the closed position. The front and rear plate cam pins 25 have idled along to the expanded position, although supplying no useful opening work at this point.

As the moving mold half and core assembly approach the fixed mold half to achieve a fully closed position, a safety switch is actuated. The function of the switch is to determine (1) that the core assembly is correctly indexed in the moving mold half; and (2) that the core assembly is fully expanded and locked. If either of these sequences has not taken place, the cycle is aborted and the entire mechanism including the press returns to a neutral position.

As the mold halves and core assembly meet, the fixed mold half of the press is considered closed and resistance to molding pressure is developed by the clamp portion of the press. A limit switch is then actuated to indicate that resisting force has been developed and that the press, in fact, is closed which enables plastic injection to take place.

In order for the core assembly to function properly and generate the inside surface of the molded part, the assembly must be capable of resisting forces generated by the molten plastic as it is forced into the cavity of the mold. The failure of the core assembly to resist this force would enable molten plastic to enter between the working surfaces of the core assembly where it would then solidify rendering the core assembly unusable. Therefore, certain devices are incorporated in the core assembly to resist this force. In addition to the cam pins riding in the end-cap cams, spacer blocks 61, 62 and 64 are provided to rest against the back of cam blocks 34, 35, 36 and 38 during the expanded portion of the cycle to resist the tendency for the end-caps to deflect under molding pressure. These spacer blocks are located such that they clear the front and rear plate cam blocks during the first 75 percent of the actuating wedge plate stroke and then extend adjacent the cam blocks during the last 25 percent of the stroke. The spacer blocks coupled with cam pins 45, 46, 48 and 49 and end-cap cam surfaces 59 provide the resisting force to prevent end-cap collapse. The front and rear side plates contain wedge insert recesses 20 which contain wedge inserts 21 that bear against the working surfaces of the actuating wedge plate. These wedge inserts bear uniformly over the surface of the wedge plate and coupled with the hydraulic locking of the wedge plate in the maximum down position, provide the resisting force for the front and rear plates.

At this point, plastic is injected into the space defined between the inside of the fixed and moving mold halves and the outside of the core assembly. The clamp portion of the press resists the tendency for the fixed and moving mold halves to spread during the application of molding pressure and the hydraulic cylinders above provide the resisting force to prevent core assembly collapse.

Coolant is then circulated through the core assembly and the moving and fixed mold halves, while the entire assembly is held in the closed position, and plastic solidification occurs.

When the part is completely solidified, a timer initiates opening of the press and movement of the core assembly, the moving mold half and the molded part moving away from the fixed mold half. The molded part is, therefore, stripped or separated from the fixed mold half.

The molded part, core assembly and moving mold half continue toward the open position until such time as the core assembly and the molded part strike knockout rods 96 which cause the core assembly to come to rest and the moving mold half to continue opening, thus stripping or separating the core assembly and the molded part from the moving mold half.

As the moving mold half separates from the core assembly, a limit switch is actuated causing the hydraulic cylinder 88 to withdraw the actuating wedge plate from the core assembly. Two operational sequences then occur substantially simultaneously which enable the core assembly to collapse: (1) the front and rear plate cam pins 25 riding in cam blocks 34, 35, 36 and 38 pull the side plates inward, separating the side plates from the inside surface of the molded part. This action occurs uniformly through 100 percent of the wedge plate stroke; (2) through the first 75 percent of the wedge plate motion the abutting relationship of the cam blocks and spacer blocks is removed and in the last 25 percent of the wedge plate motion the cam pins 45, 46, 48 and 49 riding in the end-cap cams 56 and 58 pull the end-caps inward, separating the end-caps from the molded part. As the core assembly approaches the collapse position, the molded part P is freed from the core assembly and falls off the core. In this operational embodiment, a pit is provided beneath the core assembly for reception of the pallet.

Following expansion of the core assembly and mating of the core halves, plastic material is prepared and injected into the mold cavity according to the following steps: (a) melting and mixing a mixture of a blowing agent and a thermoplastic material in an extruder at a temperature and pressure above the foaming temperature and pressure of the mixture; (b) continuously extruding the mixture into an expanding accumulation zone in continuous communication with the extruder which zone expands at a rate substantially equal to the rate of extrusion while maintaining the mixture therein in the molten state and at a pressure above the foaming pressure thereof; (c) maintaining the pallet mold at a pressure no greater than the pressure at which the mixture foams and expands, and preferably at about atmospheric pressure; (d) establishing communication between the mold and the accumulation zone; (e) rapidly passing the mixture out of the accumulation zone and into the mold cavity whereby the pressure differential between the accumulation zone and the mold cavity causes the mixture to rapidly expand in the mold; and (f) terminating communication between the mold cavity and the accumulation zone at a point when the accumulation zone is empty.

An improved overall apparatus suitable for carrying out the process for molding foamed thermoplastic pallets comprises (a) extruder means adapted to melt, mix and continuously extrude a mixture of a blowing agent and a thermoplastic material at a temperature and pressure above the foaming temperature and pressure of the mixture; (b) an expandable accumulation chamber in continuous communication with the extruder adapted to receive the mixture from the extruder and expand at a rate substantially equal to the rate of extrusion and having means for maintaining the mixture therein in the molten state and at a pressure above the foaming pressure thereof; (c) a pallet mold with expandable core assembly adapted to be maintained at a pressure no greater than the pressure at which the mixture foams and expands and preferably at about atmospheric pressure; (d) means for establishing and terminating communication between the mold and the accumulation chamber at a point where the pressure is above the foaming pressure of the mixture; (e) means for rapidly passing the mixture out of the accumulation chamber and into the mold when communication is established therebetween.

Unexpectedly, it has been found that the process of this invention not only produces a dense skin region and a cellular core region in the structural elements of the pallet but can also produce an isotropic product free of internal stresses and distortions even in molds of complex shape and thick sections at room temperature or less.

In one embodiment of this process, an accumulator device is provided which includes cylinder means having at one end thereof, communication means for the ingress of material into the cylinder from an extruder and for the egress of the material from the cylinder into a mold remote therefrom, and a piston reciprocally movable therein between a first position proximate said one end of the cylinder and a second position distant from said one end. Pressure means are also provided for applying force to the piston member in the direction of said one end. Associated with the cylinder means are valve means for establishing and terminating communication between a mold and the cylinder at a point remote from the mold and for forcing material between it and the mold into the mold. Advantageously, means are provided for automatically actuating the valve means. Further, the means can be responsive to the movement of the piston. Thus, when the piston is in the first position, the valve means can be actuated to terminate communication between the mold and the cylinder means, and when the piston is in its second position, the valve means are actuated to establish communication between the mold and cylinder means.

Thermoplastic polymeric materials in general can be molded according to the present process. Particularly preferred materials include high and low density polyethylene and polypropylene. Other suitable resins include ethylene-vinyl-acetate copolymers, rubber modified polypropylene, ethylenepropylene copolymers, crystalline polystyrene, high-impact polystyrene, acrylonitrile-butadiene-styrene polymers, vinyl resins, nylons, polyarylene polyethers, polyhydroxyether, polycarbonate, polysulfone, polyesters such as polyethylene terephthalate, cellulose esters and cellulose ethers such as cellulose acetate and cellulose acetate butyrate; and polyvinyl chloride.

The specific gravity of molded pallets may be varied from 0.4 to that of the solid resin but the best balance for toughness and stiffness is generally found in pallets that have a specific gravity range of 0.55 to 0.75.

The mixture employed in the process can also contain molding additives such as heat and light stabilizers, pigments, mold release agents, natural and synthetic fibers and slip agents. A conventional nucleating agent, such as calcium silicate, may be added to the mixture in order to enhance the uniformity of the cells produced by the foaming action. The ingredients of the mixture can be premixed, if desired, and charged to an extruder wherein the thermoplastic material is fluxed and mixed.

The blowing agent can be selected from chemical compounds such as azo, N-nitroso, carbonate and sulfonyl hydrazide compounds which are heat decomposable to yield a gas such as carbon dioxide or nitrogen. The blowing agent can also consist of normally gaseous agents such as methyl chloride, propylene, butylene and gaseous fluorocarbons, as well as gases such as nitrogen, carbon dioxide or air. Volatile liquids such as pentane, water and liquid fluorocarbons can also be employed in the foaming of the polymer.

While the various types of blowing agents which can be employed to produce a foamed product can be mixed with the plastic material at various stages in the process, it is advantageous to add liquid or gaseous agents directly to the polymeric material in the extruder, while the thermoplastic material is in a molten state in order to obtain a uniform dispersal of the agent within the molten plastic without employing additional mixing apparatus. Similarly, a decomposable chemical blowing agent is advantageously premixed with the polymer prior to the charging of the polymer into the extruder.

Careful consideration should be given to the means of obtaining a homogenous distribution of the decomposable chemical foaming agent in the plastic compound. This can be conveniently achieved by adding the foaming agent in the form of solid particles or in the form of a dispersion in a vehicle compatible with the basic resin. The mixing is then carried out in conventional equipment such as a churn, colloid mill, three-roll mill, or Banbury, the choice of which depends upon the viscosity of the plastic compound. Alternatively, to obtain uniform dispersion, pellets of plastic resin can be coated with the blowing agent by tumbling. Regardless of the method used, the foaming agent must be incorporated below its decomposition temperature to prevent the possibility of gas losses taking place in the plastic mass prior to expansion.

In the case of chemical blowing agents premixed with the polymer the time-temperature relations within the extruder must be adequate to decompose the blowing agent to release the gas within the extruder. The extruder pressure must then be maintained uniformly high at least until the mixture is transferred into the high pressure accumulator in order to prevent premature expansion of the cells.

The decomposition of the blowing agent can be delayed through the proper control of the extruder operating temperature and/or through the proper selection of the blowing agent. Thus, for example, diazoaminobenzene can be employed for decomposition at about 95° to 105° C. while azodicarbonamide can be employed for decomposition at the higher temperature range of 160° to 200° C.

The mixture being charged into the expanding zone must be maintained at a pressure above the foaming pressure thereof. While a pressure of as low as about 500 p.s.i. will normally prevent premature foaming of the mixture, pressures of at least 1,500 p.s.i. have been found to give best results. Pressures in excess of 10,000 p.s.i. are usually not required for proper operation of the accumulator device and normally should be avoided because operating expenses increase with increasing pressures.

In addition, the cylinder means is provided with heating means to maintain the mixture in the molten state and thus prevent solidification of thermoplastic material therein. It should be noted, however, that no heating of the mixture in the cylinder is required. Heat is applied to the mixture in the extruder and is only maintained in the cylinder.

The temperature of the mold is not critical. Cold molds, e.g. at room temperatures, about 20° C can be used to produce foamed pallets having a dull mottled surface similar to the texture and appearance of wood. Lower mold temperatures are preferred since the time required for cooling the article in the mold is shorter. Higher mold temperatures permit more flow of the molten mixture in the mold prior to cooling than with a cooler mold and produce a smooth, glossy or glazed mottled surface.

Molds which cause sharp pressure drops to take place therein, due to a complex configuration, or sharp corners or the like, require the use of a greater amount and pressure of blowing agent in order to achieve a particular degree of foaming.

From the foregoing description, it is evident that the process and preferred apparatus of this invention can be employed to rapidly, efficiently, and automatically mold foamed thermoplastic pallets on a batch, semi-continuous or continuous basis.

It is to be understood that while the mixture in the accumulation zone is maintained at a substantially constant pressure, this pressure being greater than the pressure at which the blowing agent causes the foaming and expansion of the foamable material, pressures which would absolutely prevent foaming are unnecessary in the instant invention for minor bubbling is not significant and is not detrimental to the resultant product.

In the present process there are two forces driving the plastic material out of the accumulator. One is the direct pressure exerted by the accumulator and the other is the force of the gas expanding as it travels from the high pressure accumulator to the low pressure mold. Accumulator pressures are generally between 1,000 and 3,500 p.s.i. while the mold pressure is low since it is vented along the parting line. In one embodiment only enough solid plastic to fill about one half of the mold is delivered by the accumulator, but since the solid plastic contains gas it expands and fills the mold with foam. As the foam flows through the mold the surface cells collapse and solid skins are formed. These skins are beneficial since the maximum tensile and compressive stresses occur on the surface when a member is subject to bending.

When the mold is not packed with solid plastic material, the pressures within the mold are low, in the range of 50 to 300 p.s.i., and aluminum, beryllium, or other metallic molds can be used. Aluminum molds remove heat from the foamed plastic about twice as fast as steel molds. Rapid heat removal is very important when cooling an insulating type of material.

It is within the spirit and scope of this invention to use screw-injection type apparatus, such as that described in U.S. Pat. No. 3,124,841, in conjunction with means as described herein for establishing and terminating communication between the mold, the accumulation zone or chamber, and the extruder (screw). The accumulation zone or chamber in this instance is between the extrusion screw and the aforesaid means for establishing and terminating communication. It is also within the spirit and scope of the present invention to employ the methods and apparatus as disclosed in U.S. Pat. Nos. 3,268,636 and 3,436,446.

The phrases "foaming pressure" and "foaming temperature" as used herein are defined as follows:

The phrase "foaming pressure" refers to the pressure at which an internally contained gas can produce substantial foaming and expansion of the plastic material within which it is contained.

The phrase "foaming temperature" refers to the temperature above which a solid or liquid blowing agent will become a gas at pressures less than the foaming pressure.

While this invention has been described in detail with particular reference to preferred embodiments thereof, it should be understood that variations and modifications can be effected within the spirit and scope of the invention as described hereinbefore and as defined in the appended claims.

I claim:

1. An expandable core assembly for use in defining a cavity within an article molded within an injection molding machine comprising a moveable wedge plate having wedge surfaces on opposite sides thereof and side edges; a front and a rear plate disposed on opposite sides of the wedge plate adjacent the wedge surfaces of the wedge plate, said front and rear plates being moveably joined to the wedge plate; a right and a left end cap moveably joined to the wedge plate along portions of the side edges thereof, said right and left end caps including cam tracks and said wedge plate including cam pins which are disposed within and moveable along each of said cam tracks, and means on said wedge plate and said front and rear plates and selectively operative to relieve force exerted against said core assembly from transmission to said wedge plate through said cam tracks and cam pins.

2. An expandable core assembly as defined in claim 1 wherein said wedge plate includes cam blocks along the side edges thereof, said cam blocks defining cam slots; and said front and rear plates include cam pins which are disposed within and moveable along each of said cam slots.

3. An expandable core assembly as defined in claim 2 wherein said end caps include spacer blocks rigidly fixed thereto, said spacer blocks being located so as to abutt said cam blocks when said wedge plate is moved to one position.

4. An expandable core assembly as defined in claim 1 wherein said wedge plate includes a first plurality of sloping wedge surfaces on one side thereof and a second plurality of sloping wedge surfaces on the opposite side thereof; and said front plate and rear plate have a plurality of wedge inserts which are located so as to be acted upon by the sloping wedge surfaces of the wedge plate when said wedge plate is moved in a first direction.

5. An expandable core assembly for use in defining a cavity within a molded article, comprising:
at least one pair of spaced apart mold members each having a first surface which defines a portion of the cavity;
an actuating member received within the space between said spaced apart mold members and movably joined to said mold members with means allowing said actuating member a predetermined extent of movement with respect to said mold members;
first cam means connected with each of said mold members;
second cam means disposed on said actuating member in complementary operative relation with said first cam means, said first and second cam means being operative to extend said mold members to a position of maximum spacing responsive to movement of said actuating member to a first position in said predetermined extent of movement and being operative to retract said mold members to a position of lesser spacing responsive to movement of said actuating member to a second position in said predetermined extent of movement;
first abutment means disposed on each of said mold members in facing relation with said actuating member;
second abutment means disposed on said actuating member in facing relation with said spaced apart mold members, said second abutment means positioned on said actuating member to be offset from said first abutment means when said actuating member is in said second position and to be in abutting relation with said first abutment means to relieve force exerted against said mold members from transmission to said actuating member through said cam means when said actuating member is in said first position.

6. An expandable core assembly as in claim 5, wherein said first abutment means comprises at least one wedge surface rigidly affixed to each of said pair of mold members; and said second abutment means comprises corresponding wedge surfaces rigidly affixed to said actuating member in position to move into wedging abutment with said at least one wedge surface of each of the mold members when said actuating member is in said first position.

7. An expandable core assembly as in claim 6, wherein said first surfaces of said mold members are proximately parallel with respect to each other.

8. An expandable core assembly for use in an injection molding apparatus for defining a cavity within a molded article, comprising:
a first pair of spaced apart mold members each having a surface which defines a portion of the cavity;
a second pair of spaced apart mold members each having a surface which defines another portion of the cavity;
an actuating member received within the space between said first and second pairs of mold members and moveably joined to each of said mold members with means allowing said actuating member a predetermined extent of movement with respect to said mold members, said first and second pairs of mold members being retained by said actuating member in predetermined spaced relation so that the space between said pairs defines a region within which said actuating member is received;
first cam means connected with each of said first pair of mold members;
second cam means disposed on said actuating member in complementary operative relation with said first cam means;
third cam means connected with each of said second pair of mold members;
fourth cam means disposed on said actuating member in complementary operative relation with said third cam means; said first and second cam means being operative to extend said first pair mold members to a position of maximum spacing responsive to movement of said actuating member to a first position in said predetermined extent of movement and said third and fourth cam means being operative to extend said second pair of mold members to a position of maximum spacing responsive to movement of said actuating member to said first position;

said first and second cam means being operative to retract said first pair of mold members to a position of lesser spacing responsive to movement of said actuating member to a second position in said predetermined extent of movement, and said third and fourth cam means being operative to retract said second pair of mold members to a position of lesser spacing responsive to movement of said actuating member to said second position;

first abutment means disposed on each of said first pair of mold members in facing relation with said actuating member;

second abutment means disposed on said actuating member in facing relation with said spaced apart first pair of mold members;

third abutment means disposed on each of said second pair of mold members in facing relation with said actuating member;

fourth abutment means disposed on said actuating member in facing relation with said spaced apart second pair of mold members;

said second abutment means positioned on said actuating member in offset relation with said first abutment means when said actuating member is in said second position and in abutting relation with said first abutment means when said actuating member is in said first position; and said fourth abutment means positioned on said actuating member in offset relation with said third abutment means when said actuating member is in said second position and in abutting relation with said third abutment means when said actuating member is in said first position; each of said abutment means in said abutting relation being cooperative to relieve force exerted against said mold members from transmission to said actuating member through said cam members.

9. An expandable core assembly as in claim 8, wherein said surfaces of said first pair of mold members are parallel with respect to each other, and said surfaces of said second pair of mold members are parallel with respect to each other, and are positioned at a substantial angle relative to said surfaces of said first pair of mold members.

10. An expandable core assembly as in claim 8, wherein:

said first and second abutment means comprise at least one set of complementary wedge surfaces rigidly affixed to each member of said first pair of mold members and to said actuating member, respectively;

said third and fourth abutment means comprise at least one set of complementary wedge surfaces rigidly affixed to each member of said second pair of mold members and to said actuating member, respectively;

said complementary wedge surfaces on said actuating member being positioned to move into wedging abutment with said respective complementary wedge surfaces on said mold members when said actuating member is in said first position.

11. An expandable core assembly as in claim 8, wherein:

said surfaces of said first pair of mold members have edges positioned in adjacent relation with edges of said surfaces of said second pair of mold members to define a core volume which is substantially enclosed around said pairs of surfaces;

the surfaces of one of said pairs of mold members including fin edge means which closely overlap the adjacent edges of the surfaces of the other pair of mold members when said pairs of mold members are in the extended position;

said fin edge means being resiliently yieldable in response to injection molding pressure to move into sealing engagement with said adjacent edges of said other pair of mold members.

12. An expandable core assembly as in claim 8, further comprising fluid flow passageway means disposed within said mold members to guide a flow of coolant fluid in heat exchange relation with said mold members.

* * * * *